United States Patent
Yang

(10) Patent No.: US 9,671,906 B2
(45) Date of Patent: Jun. 6, 2017

(54) TOUCH DISPLAY CIRCUIT, DRIVE METHOD THEREOF, ARRAY SUBSTRATE AND DISPLAY DEVICE

(71) Applicant: BEIJING BOE OPTOELECTRONICS TECHNOLOGY CO., LTD., Beijing (CN)

(72) Inventor: Shengji Yang, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 97 days.

(21) Appl. No.: 14/106,618

(22) Filed: Dec. 13, 2013

(65) Prior Publication Data

US 2014/0168157 A1   Jun. 19, 2014

(30) Foreign Application Priority Data

Dec. 13, 2012   (CN) .......................... 2012 1 0540574

(51) Int. Cl.
  *G06F 3/041*   (2006.01)
  *G06F 3/044*   (2006.01)
  *G09G 3/36*   (2006.01)

(52) U.S. Cl.
  CPC ............ *G06F 3/044* (2013.01); *G06F 3/0412* (2013.01); *G09G 3/3648* (2013.01);
  (Continued)

(58) Field of Classification Search
  None
  See application file for complete search history.

(56) References Cited

U.S. PATENT DOCUMENTS 8,587,511 B2 * 11/2013 Park ...................... G02F 1/135
                                                         345/104
2008/0018612 A1  1/2008 Nakamura et al.
(Continued)

FOREIGN PATENT DOCUMENTS

| | | |
|---|---|---|
| CN | 101581845 A | 11/2009 |
| JP | 2008-027292 A | 2/2008 |
| JP | 2012-043201 A | 3/2012 |

OTHER PUBLICATIONS

European Patent Office Communication enclosing Extended European Search Report for corresponding European Patent Application No. 13195481.0, 9 pages, (Feb. 11, 2014).
(Continued)

*Primary Examiner* — William Boddie
*Assistant Examiner* — Alecia D English
(74) *Attorney, Agent, or Firm* — Blakely, Sokoloff, Taylor & Zafman LLP

(57) ABSTRACT

The present invention provides a touch display circuit of a pixel unit, a drive method thereof, an array substrate and a display device, by means of which the process steps in manufacturing a touch display product can be reduced, and meanwhile, the aperture ratio of the product can be increased to raise the added value. The touch display circuit comprises a touch unit and a display unit; a first scanning line, a second scanning line, a detection signal line, a data line and a signal control line connected with the touch unit; and a gate line and a data line connected with the display unit, wherein the touch unit comprises a first switch transistor, a second switch transistor, a first capacitor, a touch electrode and an amplifier transistor.

19 Claims, 3 Drawing Sheets

(52) U.S. Cl.
CPC .............. *G06F 2203/04103* (2013.01); *G09G 2300/0465* (2013.01); *G09G 2354/00* (2013.01)

(56) References Cited

U.S. PATENT DOCUMENTS

| | | | |
|---|---|---|---|
| 2009/0200088 A1* | 8/2009 | Chuang | 178/18.01 |
| 2009/0284270 A1* | 11/2009 | Ota | 324/661 |
| 2009/0284492 A1 | 11/2009 | Chino | |
| 2011/0193816 A1 | 8/2011 | Kitakado | |
| 2011/0273397 A1* | 11/2011 | Hanari | 345/174 |
| 2012/0044176 A1 | 2/2012 | Nakamura et al. | |
| 2012/0313866 A1* | 12/2012 | Ha | G06F 3/0416 345/173 |
| 2013/0200379 A1* | 8/2013 | You | H01L 29/4908 257/59 |

OTHER PUBLICATIONS

First Office Action for corresponding Korean Patent Application No. 10-2013-0153986, 11 pages (including English translation), (Dec. 10, 2014).
First Office Action for corresponding Chinese Patent Application No. 201210540574.9, 15 pages (including English translation), (Jan. 27, 2015).

\* cited by examiner

TOUCH DISPLAY CIRCUIT, DRIVE METHOD THEREOF, ARRAY SUBSTRATE AND DISPLAY DEVICE

FIELD OF THE INVENTION

The present invention relates to the field of display manufacturing, in particular to a touch display circuit of a pixel unit, a drive method thereof, an array substrate and a display device.

BACKGROUND OF THE INVENTION

Advanced-Super Dimensional Switching (AD-SDS; ADS for short) technology is gradually becoming popular in consumers for its wider visual angle, higher contrast ratio, higher definition and brighter color presentation. In an ADS mode, a multi-dimensional electric field is formed by electric fields generated at edges of slit electrodes in the same layer of plane and electric fields generated between slit electrode layers and plate electrode layers in different layers, so that liquid crystal molecules in all orientations between the slit electrodes, directly above the electrodes in a liquid crystal cell can rotate, thereby increasing the liquid crystal work efficiency and improving the light transmission efficiency. In addition, in cell touch technology is also drawing more and more attention. While currently most manufacturers implement touch technology by providing a layer of capacitor film for touch at a light emerging side of a display device, a few manufacturers use the in cell touch technology on an ADS display module and have successfully put it into mass production. However, the inventor finds the problems of complicated process steps in manufacturing products and a low aperture ratio of the finished products existing in the prior art.

SUMMARY OF THE INVENTION

The present invention provides a touch display circuit of a pixel unit, a drive method thereof, an array substrate and a display device, by means of which the process steps in manufacturing a touch display product can be reduced, thereby saving the cost, and meanwhile, the aperture ratio of the product can be increased to raise the added value. To achieve the above object, the present invention adopts the following technical solution.

In one aspect, provided is a touch display circuit of a pixel unit, comprising a touch unit and a display unit; a first scanning line, a second scanning line, a detection signal line, a data line and a signal control line connected with the touch unit; and a gate line and the data line connected with the display unit, wherein the touch unit comprises a first switch transistor, a second switch transistor, a first capacitor, a touch electrode and an amplifier transistor; the source of the first switch transistor is connected to the data line, and the gate of the first switch transistor is connected to the signal control line; the touch electrode is connected to the drain of the first switch transistor; the gate of the amplifier transistor is connected to the touch electrode, and the source of the amplifier transistor is connected to the second scanning line; the gate of the second switch transistor is connected to the first scanning line, the source of the second switch transistor is connected to the drain of the amplifier transistor, and the drain of the second switch transistor is connected to the detection signal line; and a first electrode of the first capacitor is connected to the second scanning line, and a second electrode of the first capacitor is connected to the touch electrode.

Optionally, the display unit comprises a third switch transistor and a second capacitor, wherein the gate of the third switch transistor is connected to the gate line, and the source of the third switch transistor is connected to the data line; and a first electrode of the second capacitor is connected to the drain of the third switch transistor, and a second electrode of the second capacitor is connected to a ground terminal.

Optionally, the first electrode of the first capacitor is formed by the same layer of transparent conductive material as a pixel electrode of the display unit, and the second electrode of the first capacitor is formed by the same layer of transparent conductive material as a common electrode of the display unit.

Optionally, for all of the first switch transistor, the second switch transistor, the third switch transistor and the amplifier transistor, the gates thereof are formed by the same layer of material, and the sources and the drains thereof are formed by the same layer of material.

Optionally, the third switch transistor is a P-type transistor or an N-type transistor.

Optionally, the first switch transistor and the second switch transistor are P-type transistors or N-type transistors, and the amplifier transistor is a P-type transistor.

Optionally, the second switch transistor and the amplifier transistor are located at one side of the touch electrode, and the first switch transistor is located at the other side of the touch electrode which is the opposite side of the one side.

Optionally, the first scanning line, the second scanning line and the signal control line are all formed on the same layer as the gate line, are arranged in parallel with the gate line, and are all located in gaps between the current pixel unit and the previous-stage pixel unit or the next-stage pixel unit.

Optionally, the detection signal line of the current pixel unit is the data line of the previous-stage pixel unit.

In another aspect, provided is a drive method for driving the touch display circuit described above, comprising: in a first stage, cutting off the first switch transistor, the second switch transistor and the amplifier transistor, inputting a scanning signal through the gate line, and inputting a control signal through the data line of the current pixel unit to control the display unit to be in a display state; in a second stage, turning on the first switch transistor, cutting off the second switch transistor and the amplifier transistor, inputting a reset signal through the data line to charge the second electrode of the first capacitor, and inputting a scanning signal through the gate line to turn off the display unit; and in a third stage, cutting off the first switch transistor, turning on the second switch transistor, providing a coupling pulse signal through the second scanning line, and when the touch electrode is touched, the second electrode of the first capacitor is discharged until the voltage difference between the gate and the source of the amplifier transistor is equal to a threshold voltage of the amplifier transistor, so that the amplifier transistor is turned on and into an amplification state, thereby amplifying the coupling pulse signal provided by the second scanning line and outputting the amplified signal to the detection signal line.

Optionally, the drive method also comprises: in the first stage, turning on the third switch transistor; and in the second stage and the third stage, cutting off the third switch transistor.

In yet another aspect, provided is a pixel unit, the pixel unit comprises any one of the above touch display circuits.

In still another aspect, provided is an array substrate, wherein at least one pixel unit of the array substrate comprises any one of the above touch display circuits.

Optionally, the detection signal line is a data line on the array substrate, and the current pixel unit comprising the touch display circuit is located between the detection signal line and the data line of the current pixel unit, and the detection signal line supplies a display drive signal to the previous-stage pixel unit of the current pixel unit.

In a further aspect, provided is a display panel, which comprises the above array substrate.

In a still further aspect, provided is a display device, which comprises the above display panel.

In the present invention, by integrating the circuit of the touch unit and the circuit of the display unit, the touch unit can be formed in the process flow of manufacturing the display unit, and thus the process steps in manufacturing the touch display product are reduced to save the cost, and meanwhile, the aperture ratio of the product can be increased to raise the added value.

BRIEF DESCRIPTION OF THE DRAWINGS

To more clearly explain the technical solution in the present invention or the prior art, the drawings required to be used in description of the embodiments of the present invention or in description of the prior art will be introduced simply below. Obviously, the drawings described below are only for illustrating some embodiments of the present invention, and other drawings can be obtained according to these drawings by persons skilled in the art without any creative work. In the drawings.

DETAILED DESCRIPTION OF THE EMBODIMENTS

Figure 1:
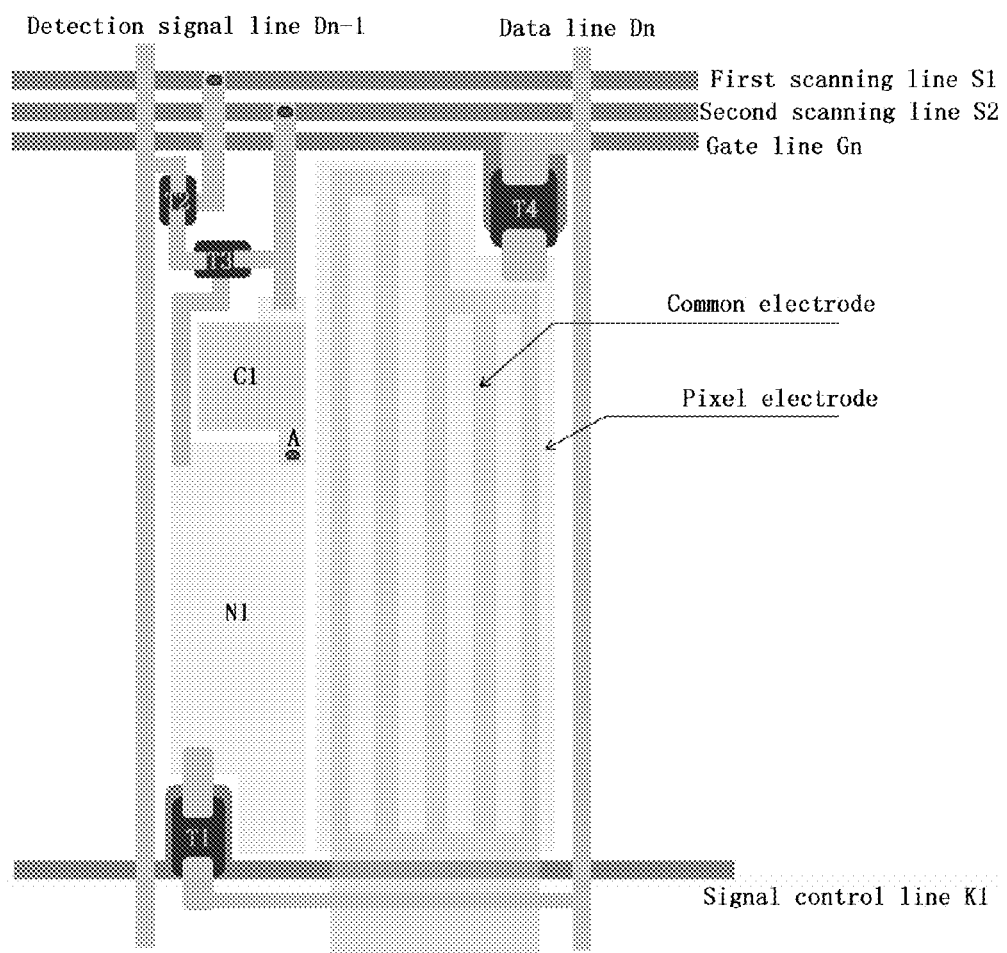
FIG. 1 is a schematic diagram of a touch display circuit of a pixel unit provided according to an embodiment of the present invention.

The technical solution of the embodiments of the present invention will be described in a clear and complete manner in conjunction with the drawings. Apparently, the described embodiments are only part of the embodiments of the present invention instead of all the embodiments. Based on the descried embodiments, all other embodiments obtained by persons skilled in the art without creative work are intended to be encompassed by the protection scope of the present invention.

The switch transistors and the amplifier transistors adopted in all the embodiments of the present invention can be thin film transistors or field effect transistors or other devices with the same properties. As the source and the drain of a switch transistor adopted herein are symmetrical to each other, the source and the drain are interchangeable. In the embodiments of the present invention, to distinguish between the two electrodes other than the gate of the transistor, one is called the source, and the other is called the drain. As shown in the drawings, it is defined that the middle terminal is the gate, the signal input terminal is the source, and the signal output terminal is the drain. In addition, the switch transistors adopted in the embodiments of the present invention include two types: a P-type switch transistor and an N-type switch transistor, wherein the P-type switch transistors is turned on when the gate is at a low level, and is cut off when the gate is at a high level; the N-type switch transistor is turned on when the gate is at a high level, and is cut off when the gate is at a low level; amplifier transistors include two types: a P-type amplifier transistor and an N-type amplifier transistor, wherein the P-type amplifier transistor is in an amplification state when the gate voltage is at a low level (the gate voltage is smaller than the source voltage) and the absolute value of the voltage difference between the gate and the source is larger than a threshold voltage, and the input voltage of the source can be amplified and outputted at the drain; wherein the N-type amplifier transistor is in an amplification state when the gate voltage is at a high level (the gate voltage is larger than the source voltage) and the absolute value of the voltage difference between the gate and the source is larger than a threshold voltage, and the input voltage of the source can be amplified and outputted at the drain; of course, the embodiments of the present invention only adopt the P-type amplifier transistor.

Figure 2:
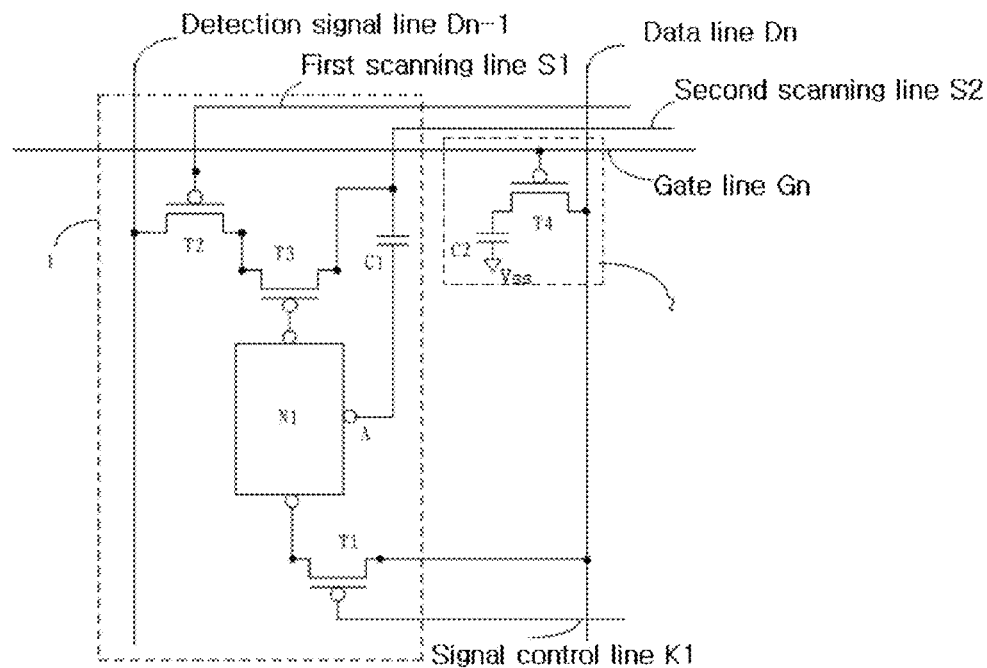
FIG. 2 is an equivalent circuit diagram of the touch display circuit shown in FIG. 1.

FIG. 1 is a touch display circuit of a pixel unit provided according to an embodiment of the present invention. FIG. 2 is an equivalent circuit diagram of the touch display circuit shown in FIG. 1. As shown in FIGS. 1 and 2, the touch display circuit comprises a touch unit 1 and a display unit 2; a first scanning line S1, a second scanning line S2, a detection signal line Dn−1, a data line Dn and a signal control line K1 connected with the touch unit 1; and a gate line Gn and the data line Dn connected with the display unit 2, wherein the touch unit 1 comprises a first switch transistor T1, a second switch transistor T2, a first capacitor C1, a touch electrode N1 and an amplifier transistor T3; the source of the first switch transistor T1 is connected to the data line Dn, and a gate of the first switch transistor T1 is connected to the signal control line K1; the touch electrode N1 is connected to the drain of the first switch transistor T1; a gate of the amplifier transistor T3 is connected to the touch electrode N1, and the source of the amplifier transistor T3 is connected to the second scanning line S2; a gate of the second switch transistor T2 is connected to the first scanning line S1, the source of the second switch transistor T2 is connected to the drain of the amplifier transistor T3, and the drain of the second switch transistor T2 is connected to the detection signal line Dn−1; and a first electrode of the first capacitor C1 is connected to the second scanning line S2, and a second electrode of the first capacitor C1 is connected to the touch electrode N1.

Here, the first capacitor C1 can be formed in the process steps of manufacturing the display unit.

Preferably, the first capacitor C1 is manufactured in combination with manufacturing the ADS-mode display unit 2, wherein the first electrode of the first capacitor C1 and a pixel electrode of the display unit 2 are formed in the same patterning step, and the second electrode of the first capacitor C1 and a common electrode of the display unit 2 are formed in the same patterning step; as shown in FIG. 1, the first electrode of the first capacitor C1 and the pixel electrode of the display unit 2 are formed by the same layer of transparent conductive material, and the second electrode of the first capacitor and the common electrode of the display unit are formed by the same layer of transparent conductive material. In the embodiment shown in FIG. 1, the transparent conductive material of the pixel electrode and the transparent conductive material of the common electrode are both tin indium oxide (ITO). That is, during manufacturing the common electrode and the pixel electrode of the display unit 2, part of the common electrode and part of the pixel electrode corresponding to the touch unit 1 are retained, and the first capacitor C1 is formed by overlapping of the part of the common electrode and the part of the pixel electrode. Of course, the common electrodes and the pixel electrodes in the two areas of the touch unit 1 and the display unit 2 are respectively disconnected from each other. Moreover, for example, the common electrode of the display unit 2 can be a slit electrode, and the pixel electrode thereof can be a plate electrode.

Of course, as the first electrode and the second electrode of the first capacitor C1 are interchangeable, the first electrode of the first capacitor C1 can be formed by the same layer of transparent conductive material as the common electrode of the display unit 2, and the second electrode of the first capacitor C1 can be formed by the same layer of transparent conductive material as the pixel electrode of the display unit 2.

Further, the touch electrode N1 and the pixel electrode of the display unit 2 are formed in a same patterning step; as shown in FIG. 1, the touch electrode N1 and the pixel electrode of the display unit 2 are formed by the same layer of transparent conductive material; and the second electrode of the first capacitor C1 is connected with the touch electrode N1 through a via hole A. Of course, the depth of the via hole A is determined by the distance between the common electrode and the pixel electrode of the display unit 2.

Further, all the transistors T1, T2 and T3 of the touch unit 1 and the transistor T4 of the display unit 2 are formed in a same step. As shown in FIG. 1, for all the transistors T1, T2 and T3 of the touch unit 1 and the transistor T4 of the display unit 2, the gates thereof can be formed by the same layer of material, and the sources and the drains thereof can be formed by the same layer of material.

Further, the second switch transistor T2 and the amplifier transistor T3 are located at one side of the touch electrode N1, and the first switch transistor T1 is located at the other side of the touch electrode N1 which is the opposite side of the one side.

Further, as shown in FIG. 1, the first scanning line S1, the second scanning line S2 and the signal control line K1 are all formed on the same layer and in the same step as the gate line Gn of the display unit 2, are arranged in parallel with the gate line Gn, and are all located in gaps between the pixel units and do not affect the aperture ratio of the pixel units. In this case, for example, the gate line Gn of the display unit 2 can be formed in the same patterning step as the gate of the third transistor T4 of display unit 2.

Further, for wiring requirement and signal input, the first scanning line S1 and the second scanning line S2 of the same touch display circuit are located at the side close to the second switch transistor T2 and the amplifier transistor T3, i.e. located at the outer side of the gate line Gn, and the third switch transistor T4 of the display unit 2 is connected at the inner side of the gate line Gn; and the signal control line K1 is located at the side close to the first switch transistor T1, i.e. located at the outer side of the gate line Gn+1 (refer to FIG. 5), and the display unit 2 of the Gn+1 row is connected at the inner side of the gate line Gn+1.

Further, the first switch transistor T1, the second switch transistor T2 and the amplifier transistor T3 can all be connected with other components through a data line (such as the data line Dn), which is retained in the touch unit 1 during manufacturing the display unit 2, as the connecting line, and are connected through via holes where necessary. For example, the gate of the second switch transistor T2 is connected to the first scanning line S1 through a data line (such as the data line Dn), which is retained in the touch unit 1 during manufacturing the display unit 2, as the connecting line, and is connected through a via hole where necessary. For example, via hole connection is performed at the end of the connecting line close to the first scanning line S1. The depth and the position of the via hole depend on the interlayer distance between the first scanning line S1 and the data line and the position relation between the components. In this case, for example, the data line in the display unit 2 can be formed in the same patterning step as the source and the drain of the transistors.

The patterning step can include the processes of manufacturing a pattern mask, exposure, development, photoetching, etching and the like.

For instance, forming the gate on a substrate by the patterning step specifically includes: depositing a gate layer film on the substrate; applying a photoresist, and performing exposure and development treatment on the photoresist by using a mask, thus forming a photoresist pattern; with the photoresist pattern as an etching mask, through the steps of etching and the like, removing a corresponding electrode layer, and removing the remaining photoresist; and finally, forming a gate pattern on the substrate.

Optionally, the display unit 2 comprises a third switch transistor T4 and a second capacitor C2, wherein the second capacitor C2 comprises a liquid crystal capacitor between a pixel electrode and the common electrode of the display unit 2, and a parasitic capacitor of the third switch transistor T4, wherein the gate of the third switch transistor T4 is connected to the gate line Gn, and the source of the third switch transistor T4 is connected to the data line Dn; and the pixel electrode, as a first electrode of the second capacitor C2, is connected to the drain of the third switch transistor T4, and the common electrode, as a second electrode of the second capacitor T2, is connected to a ground terminal Vss.

Optionally, the first switch transistor T1 and the second switch transistor T2 are P-type transistors or N-type transistors; and the amplifier transistor T3 is a P-type transistor.

Optionally, the third switch transistor T4 is a P-type transistor or an N-type transistor. The touch display circuit provided by the embodiment of the present invention integrates the circuit of the touch unit and the circuit of the display unit, and the touch unit can be formed in the process steps of manufacturing the display unit, and thus the process steps in manufacturing the touch display product can be reduced to save the cost, and meanwhile, the aperture ratio of the product can be increased to raise the added value. An embodiment of the present invention also provides a drive method of the touch display circuit of the above embodiments, comprising: in a first stage, cutting off the first switch transistor T1, the second switch transistor T2 and the amplifier transistor T3, inputting a scanning signal through the gate line Gn, and inputting a control signal through the data line Dn to control the display unit 2 to be in a display state; in a second stage, turning on the first switch transistor T1, cutting off the second switch transistor T2 and the amplifier transistor T3, inputting a reset signal through the data line Dn to charge the second electrode of the first capacitor C1, and inputting a scanning signal through the gate line Gn to turn off the display unit 2; and in a third stage, cutting off the first switch transistor T1, turning on the second switch transistor T2, providing a coupling pulse signal through the second scanning line S2, and when the touch electrode N1 is touched, the second electrode of the first capacitor C1 is discharged until the voltage difference between the gate and the source of the amplifier transistor T3 is equal to a threshold voltage of the amplifier transistor T3, so that the amplifier transistor T3 is turned on and comes into an amplification state, thereby amplifying the coupling pulse signal provided by the second scanning line S2 and outputting the amplified signal to the detection signal line Dn−1.

Further, in the first stage, the third switch transistor T4 is turned on; and in the second stage and the third stage, the third switch transistor T4 is cut off.

Here, description is made with all of the first switch transistor T1, the second switch transistor T2, the amplifier transistor T3 and the third switch transistor T4 being P-type transistors as an example.

The drive method of the touch display circuit provided by the embodiment of the present invention is described below in details with reference to the circuit diagram provided by FIG. 2 and the schematic diagram of the time sequence states of signals of the touch display circuit provided by FIG. 3.

Figure 3:
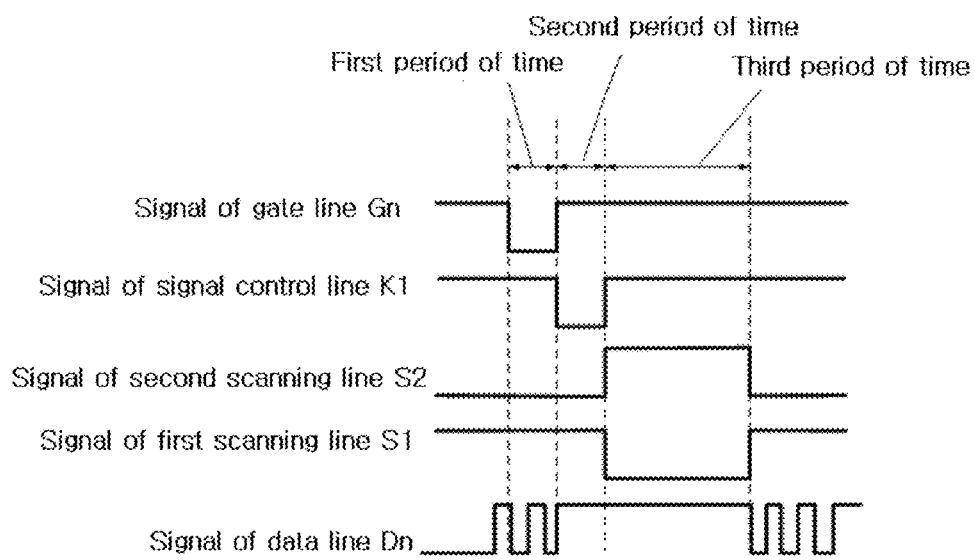
FIG. 3 is a schematic diagram of the time sequence states of drive signals of the touch display circuit provided according to an embodiment of the present invention.

Specifically, in the first stage, i.e. in the first period of time in the schematic diagram of the time sequence states shown in FIG. 3, a low-level signal is applied to the gate line Gn and the second scanning line S2, a high-level signal is applied to the signal control line K1 and the first scanning line S1, and an output grey scale signal is applied to the data line Dn; at that time, the third switch transistor T4 of the display unit 2 is turned on, and as the output grey scale signal is applied to the data line Dn, the display unit 2 is in a display stage at that time; and the first switch transistor T1, the second switch transistor T2 and the amplifier transistor T3 are all in a cut-off state, and therefore, the touch unit 1 does not operate.

In the second stage, i.e. in the second period of time in the schematic diagram of the time sequence states shown in FIG. 3, a high-level signal is applied to the gate line Gn and the first scanning line S1, a low-level signal is applied to the signal control line K1 and the second scanning line S2, and a high-level reset signal is applied to the data line Dn; at that time, the third switch transistor T4 of the display unit 2 is cut off, the display is ended, and the first switch transistor T1 of the touch unit 1 is turned on, and at that time, the high-level reset signal applied to the data line Dn is used for charging the first capacitor C1 connected with the touch electrode N1, and at that time, the voltage of a node A connected with the touch electrode N1 is raised to V1, to prepare for the next stage.

Figure 4:
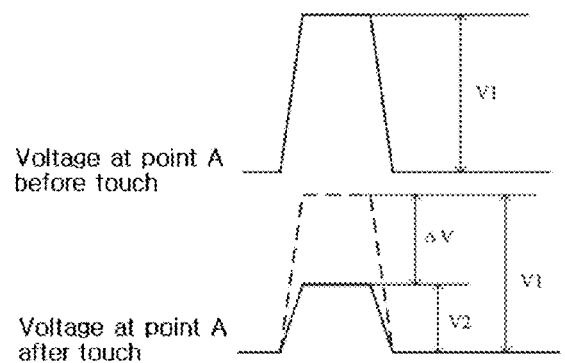
FIG. 4 is a schematic diagram of the voltage changes on a touch electrode of the touch display circuit provided according to an embodiment of the present invention.

In the third stage, i.e. in the third period of time in the schematic diagram of the time sequence states shown in FIG. 3, a high-level signal is applied to the gate line Gn, the signal control line K1 and the second scanning line S2, and a low-level signal is applied to the first scanning line S1; at that time, the third switch transistor T4 of the display unit 2 is cut off, the first switch transistor T1 of the touch unit 1 is cut off, and the second switch transistor T2 is turned on; and in this stage, the second scanning line S2 supplies a high-level signal to an electrode of the first capacitor C1, thereby forming coupling capacitance. As shown in FIG. 4, as in the second stage, the first capacitor C1 is charged to form a voltage V1 on the touch electrode N1, when a finger touches the touch electrode N1 from above, it will result in a voltage drop on the touch electrode N1, and at that time, a coupling voltage supplied to the first capacitor by the signal control line K1 can also maintain the source voltage of the amplifier transistor T3; as the gate of the amplifier transistor T3 is connected to the touch electrode N1, when the voltage on the touch electrode N1 is dropped to V2 and the generated voltage drop ΔV (i.e. V1-V2) satisfies the conductive condition of the amplifier transistor T3 (here, the conductive condition is that the absolute value of the difference between the gate voltage and the source voltage of the transistor is larger than the conductive threshold voltage, and as the P-type transistor is adopted, the gate voltage is smaller than the source voltage when the transistor is turned on), the amplifier transistor T3 is turned on and comes into the amplification state, and as the second switch transistor T2 is turned on, the amplifier transistor T3 will amplify the high-level signal on the second scanning line S2 and then output the amplified signal to the detection signal line Dn−1; and at that time, the touch position can be located by determining a first coordinate direction through the first scanning line S1, and determining a second coordinate direction perpendicular to the first coordinate direction through the output signal change value on the detection signal line Dn−1.

Here, with a signal of the first scanning line S1 as the signal of the X-axis coordinate direction, and a signal of the detection signal line Dn−1 as the signal of the Y-axis coordinate direction, when the first scanning line S1 inputs the signal, the coordinate of the X-axis direction is determined; at that time, as the second switch transistor T2 is turned on, the amplifier transistor T3 will amplify the high-level signal on the second scanning line S2 and output the amplified signal to the detection signal line Dn−1; and at that time, when the change of the signal on the detection signal line Dn−1 is detected, the coordinate positions on the X and Y coordinate axes are determined at the same time, and the touch position is determined accordingly.

Here, after the third stage is ended, a control signal is inputted to other gate lines following the gate line of the current pixel unit successively to achieve drive of other pixel units, and as the design of the signal on each data line on the array substrate is the same, the touch display circuit provided by the embodiment of the present invention is driven in a time-division manner, that is, in the touch stage, an data line input is used as a signal of touch, and in the display stage, a data line input is used as a grey scale signal for pixel driving; in addition, it can be known from the above time sequence states of driving that the data line is not used for displaying the input of the grey scale signal, and therefore, outputting the touch signal on the previous-stage data line Dn−1 serving as a signal detection line will not affect the normal grey scale output of a display device, and when the amplifier transistor T3 amplifies the high-level signal on the second scanning line S2 and outputs the amplified signal to the detection signal line Dn−1, the value of change between the signal at that time and the previously input touch signal can be detected by the detection signal line Dn−1.

The embodiment of the present invention does not limit the type of the specific transistors, of course, when all adopt P-type transistors, it is more advantageous for reducing the process steps in the manufacturing process, and meanwhile, as all the transistors can be formed at the same time, it is more advantageous for the unity of device performance, and the advantages of adopting low temperature poly-silicon (LTPS) technology are manifested here. For a transistor device formed through the technology, in addition to high carrier migration rate (the transistor can be made small, thereby increasing the aperture rate), the amplifier transistor T3 can have a relatively high breakdown voltage, and meanwhile, the gate signal of the amplifier transistor T3 can be reduced with the touch by a finger, and thus with the P-type transistors, it is more readily to make the absolute value of the voltage difference between the gate and the source of the amplifier transistor T3 (the gate voltage Vg< the source voltage Vs) is larger than the threshold voltage (Vth).

An embodiment of the present invention provides a pixel unit, which comprises any touch display circuit provided by the above embodiments.

An embodiment of the present invention provides an array substrate, at least one pixel unit of which comprises a touch display circuit provided by any one of the above embodiments. Optionally, the detection signal line Dn−1 is a data line on the array substrate, and the current pixel unit comprising the touch display circuit is located between the detection signal line Dn−1 and the data line Dn of the current pixel unit, and the detection signal line Dn−1 supplies a display drive signal to the previous-stage pixel unit of the current pixel unit.

The distribution density on the array substrate, of the pixel unit comprising the touch display circuit provided by the embodiment of the present invention can be set at will according to the pixel size that can be provided by the array substrate and the requirement for touch accuracy, and when the requirement for touch accuracy is high, the set density is increased accordingly, and of course, this can affect the overall transmission ratio of a display panel.

Figure 5:
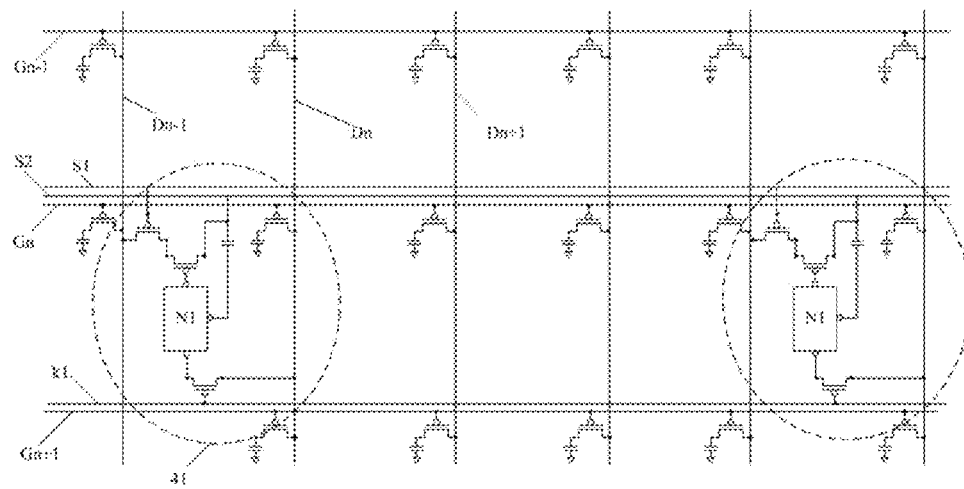
FIG. 5 is a schematic diagram of an array substrate comprising the touch display circuit provided according to an embodiment of the present invention.

As shown in FIG. 5, an embodiment of the present invention provides a circuit schematic diagram of pixel units in 4×4 distribution on an array substrate with the above touch display circuit, that is, one of every four pixel units on the array substrate in the transverse direction or longitudinal direction comprises the touch display circuit provided by the embodiment of the present invention. In addition, as shown in FIG. 5, the detection signal line Dn−1 in the pixel unit comprising the touch display circuit provided by the embodiment of the present invention (the data line of the previous-stage pixel unit) is a data line on the array substrate, which is adjacent to a data line Dn of the current pixel unit comprising the touch display circuit; the current pixel unit is located between the detection signal line Dn−1 and the data line Dn of the current pixel unit; and the detection signal line Dn−1 is connected with a display unit of the previous-stage pixel unit to supply a display drive signal thereto.

In this case, FIG. 5 also shows a structure, on the array substrate, for connecting with the corresponding signal line, of the current pixel unit in which the touch display circuit is located; as shown in FIG. 5, by taking the pixel unit 41 comprising the touch display circuit provided by the embodiment of the present invention as an example, the touch display circuit is respectively connected with the gate line Gn, the first scanning line S1, the second scanning line S2, the signal control line K1, the data line Dn and the detection signal line Dn−1 (the data line of the previous-stage pixel unit); in addition, the figure also shows a data line Dn+1 of a next-stage pixel unit, a gate line Gn−1 of the previous-stage pixel unit (i.e. the gate line that gives a switching signal previous to the gate line Gn of the current pixel unit in the time sequence), a gate line Gn+1 of the next-stage pixel unit (i.e. the gate line that gives a switching signal following the gate line Gn of the current pixel unit in the time sequence).

Figure 6:
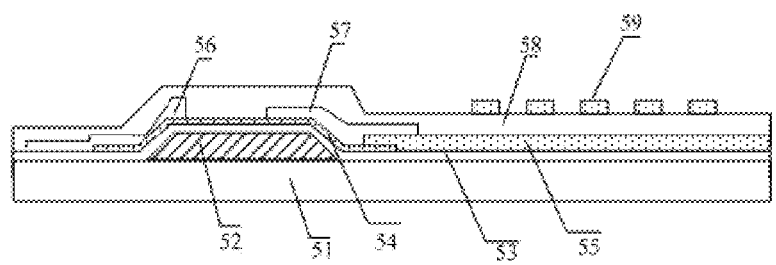
FIG. 6 is a sectional schematic diagram of a pixel unit based on an ADS mode provided according to an embodiment of the present invention.

As shown in FIG. 6, an embodiment of the present invention provides an array substrate with an ADS-mode display unit. In this case, a gate 52 is formed on an underlaying substrate 51; a gate insulating layer 53 is formed on the gate 52; an active layer 54 is formed on the gate insulating layer 53; a pixel electrode 55, the source 56 and the drain 57 are formed on the active layer 54, wherein the pixel electrode 55 is connected with the drain 57; a protective layer 58 is formed on the pixel electrode 55, the source 56 and the drain 57; and a common electrode 59 is formed on the protective layer 58, wherein the common electrode 59 is a slit electrode, and the pixel electrode 55 is a plate electrode. Of course, the present invention is not limited to the ADS mode with such a structure, and it is not defined herein. For example, it is also possible for the common electrode 59 to be a plate electrode, and the pixel electrode 55 to be a slit electrode. The specific manufacturing steps and working principle of the structure fall under the prior art, and are not described again herein.

The array substrate provided by the embodiment of the present invention integrates the circuit of the touch unit and the circuit of the display unit, and the touch unit can be formed in the process flow of manufacturing the display unit, and thus the process steps in manufacturing the touch display product can be reduced to save the cost, and meanwhile, the aperture ratio of the product can be increased to raise the added value.

An embodiment of the present invention provides a display panel, which comprises the array substrate provided by the above embodiment.

An embodiment of the present invention provides a display device, which comprises the display panel provided by the above embodiment. The display unit can be an electronic book, a mobile phone, a television, a digital photo frame and the like.

The display device provided by the embodiment of the present invention integrates the circuit of the touch unit and the circuit of the display unit, and the touch unit provided by the embodiment of the present invention can be formed in the process flow of manufacturing the display unit, and thus the process steps in manufacturing the touch display product can be reduced to save the cost, and meanwhile, the aperture ratio of the product can be increased to raise the added value.

Only specific embodiments of the present invention are described above, but the protection scope of the present invention is not limited thereto. Some of the technical features described above can be omitted in the embodiments of the present invention, only to solve part of the technical problems existing in the prior art. Moreover, the disclosed technical features can be combined arbitrarily, and any alteration or substitution that is readily conceivable to those skilled in the art within the technical scope of disclosure of the present invention is intended to be encompassed by the protection scope of the present invention. The protection scope of the claims should prevail over the protection scope of the present invention.

What is claimed is:
1. A touch display circuit in a pixel unit, comprising:
   a touch unit and a display unit, wherein the touch unit and the display unit are located in one pixel unit;
   a first scanning line, a second scanning line, a detection signal line, a data line and a signal control line connected with the touch unit; and a gate line and the data line connected with the display unit, wherein the display unit and the touch unit share the same data line, and wherein the touch unit comprises a first switch transistor, a second switch transistor, a first capacitor, a touch electrode and an amplifier transistor;

the source of the first switch transistor is connected to the data line, and the gate of the first switch transistor is connected to the signal control line;

the touch electrode is connected to the drain of the first switch transistor;

the gate of the amplifier transistor is connected to the touch electrode, and the source of the amplifier transistor is connected to the second scanning line;

the gate of the second switch transistor is connected to the first scanning line, the source of the second switch transistor is connected to the drain of the amplifier transistor, and the drain of the second switch transistor is connected to the detection signal line; and a first electrode of the first capacitor is directly connected to the second scanning line, and a second electrode of the first capacitor is connected to the touch electrode, wherein the first electrode of the first capacitor is formed by the same layer of transparent conductive material as a pixel electrode of the display unit, and the second electrode of the first capacitor is formed by the same layer of transparent conductive material as a common electrode of the display unit.

2. The circuit according to claim 1, wherein the display unit comprises:

a third switch transistor and a second capacitor, wherein the gate of the third switch transistor is connected to the gate line, and the source of the third switch transistor is connected to the data line;

a first electrode of the second capacitor is connected to the drain of the third switch transistor, and a second electrode of the second capacitor is connected to a ground terminal.

3. The circuit according to claim 2, wherein the gates of the first switch transistor, the second switch transistor, the third switch transistor and the amplifier transistor are all formed by the same layer of material, and the sources and the drains thereof are formed by the same layer of material.

4. The circuit according to claim 3, wherein the first switch transistor and the second switch transistor are P-type transistors or N-type transistors;

and the amplifier transistor is a P-type transistor.

5. The circuit according to claim 2, wherein the third switch transistor is a P-type transistor or an N-type transistor.

6. The circuit according to claim 5, wherein the first switch transistor and the second switch transistor are P-type transistors or N-type transistors;

and the amplifier transistor is a P-type transistor.

7. The circuit according to claim 2, wherein the first switch transistor and the second switch transistor are P-type transistors or N-type transistors;

and the amplifier transistor is a P-type transistor.

8. The circuit according to claim 1, wherein the first switch transistor and the second switch transistor are P-type transistors or N-type transistors;

and the amplifier transistor is a P-type transistor.

9. The circuit according to claim 1, wherein the first switch transistor and the second switch transistor are P-type transistors or N-type transistors;

and the amplifier transistor is a P-type transistor.

10. The circuit according to claim 1, wherein the second switch transistor and the amplifier transistor are located at one side of the touch electrode, and the first switch transistor is located at the other side of the touch electrode which is the opposite side of the one side.

11. The circuit according to claim 1, wherein the first scanning line, the second scanning line and the signal control line are all formed on the same layer as the gate line, are arranged in parallel with the gate line, and are all located in gaps between the current pixel unit and the previous-stage pixel unit or the next-stage pixel unit.

12. The circuit according to claim 1, wherein the detection signal line of the current pixel unit is the data line of the previous-stage pixel unit.

13. A drive method for driving a touch display circuit in the pixel unit comprising: a touch unit and a display unit, wherein the touch unit and the display unit are located in one pixel unit; a first scanning line, a second scanning line, a detection signal line, a data line and a signal control line connected with the touch unit; and a gate line and the data line connected with the display unit, wherein the display unit and the touch unit share the same data line, and wherein the touch unit comprises a first switch transistor, a second switch transistor, a first capacitor, a touch electrode and an amplifier transistor; the source of the first switch transistor is connected to the data line, and the gate of the first switch transistor is connected to the signal control line; the touch electrode is connected to the drain of the first switch transistor; the gate of the amplifier transistor is connected to the touch electrode, and the source of the amplifier transistor is connected to the second scanning line; the gate of the second switch transistor is connected to the first scanning line, the source of the second switch transistor is connected to the drain of the amplifier transistor, and the drain of the second switch transistor is connected to the detection signal line; and a first electrode of the first capacitor is directly connected to the second scanning line, and a second electrode of the first capacitor is connected to the touch electrode, the method comprising:

in a first stage, cutting off the first switch transistor, the second switch transistor and the amplifier transistor, inputting a scanning signal through the gate line, and inputting a control signal through the data line of the current pixel unit to control the display unit to be in a display state;

in a second stage, turning on the first switch transistor, cutting off the second switch transistor and the amplifier transistor, inputting a reset signal through the data line to charge the second electrode of the first capacitor, and inputting a scanning signal through the gate line to turn off the display unit; and in a third stage, cutting off the first switch transistor, turning on the second switch transistor, providing a coupling pulse signal through the second scanning line, and when the touch electrode is touched, the second electrode of the first capacitor is discharged until the voltage difference between the gate and the source of the amplifier transistor is equal to a threshold voltage of the amplifier transistor, so that the amplifier transistor is turned on and in an amplification state, thereby amplifying the coupling pulse signal provided by the second scanning line and outputting the amplified signal to the detection signal line, wherein the first electrode of the first capacitor is formed by the same layer of transparent conductive material as a pixel electrode of the display unit, and the second electrode of the first capacitor is formed by the same layer of transparent conductive material as a common electrode of the display unit.

14. The method according to claim 13, wherein the display unit comprises: a third switch transistor and a second capacitor,
  wherein the gate of the third switch transistor is connected to the gate line, and the source of the third switch transistor is connected to the data line;
  a first electrode of the second capacitor is connected to the drain of the third switch transistor, and a second electrode of the second capacitor is connected to a ground terminal; and
  the gates of the first switch transistor, the second switch transistor, the third switch transistor and the amplifier transistor are all formed by the same layer of material, and the sources and the drains thereof are formed by the same layer of material.

15. The method according to claim 14, the method further comprising
  in the first stage, turning on the third switch transistor; and
  in the second stage and the third stage, cutting off the third switch transistor.

16. The method according to claim 13, wherein the first electrode of the first capacitor is formed by the same layer of transparent conductive material as a pixel electrode of the display unit, and the second electrode of the first capacitor is formed by the same layer of transparent conductive material as a common electrode of the display unit.

17. The method according to claim 13, wherein the first scanning line, the second scanning line and the signal control line are all formed on the same layer as the gate line, are arranged in parallel with the gate line, and are all located in gaps between the current pixel unit and the previous-stage pixel unit or the next-stage pixel unit.

18. The method according to claim 13, wherein the detection signal line of the current pixel unit is the data line of the previous-stage pixel unit.

19. A display panel, comprising an array substrate, wherein at least one pixel unit of the array substrate comprises a touch display circuit comprising:
  a touch unit and a display unit, wherein the touch unit and the display unit are located in one pixel unit;
  a first scanning line, a second scanning line, a detection signal line, a data line and a signal control line connected with the touch unit; and
  a gate line and the data line connected with the display unit, wherein the display unit and the touch unit share the same data line, and
  wherein the touch unit comprises a first switch transistor, a second switch transistor, a first capacitor, a touch electrode and an amplifier transistor;
  the source of the first switch transistor is connected to the data line, and the gate of the first switch transistor is connected to the signal control line;
  the touch electrode is connected to the drain of the first switch transistor;
  the gate of the amplifier transistor is connected to the touch electrode, and the source of the amplifier transistor is connected to the second scanning line;
  the gate of the second switch transistor is connected to the first scanning line, the source of the second switch transistor is connected to the drain of the amplifier transistor, and the drain of the second switch transistor is connected to the detection signal line; and a first electrode of the first capacitor is connected to the second scanning line, and a second electrode of the first capacitor is connected to the touch electrode, wherein the first electrode of the first capacitor is formed by the same layer of transparent conductive material as a pixel electrode of the display unit, and the second electrode of the first capacitor is formed by the same layer of transparent conductive material as a common electrode of the display unit.

* * * * *